Patented Dec. 15, 1931

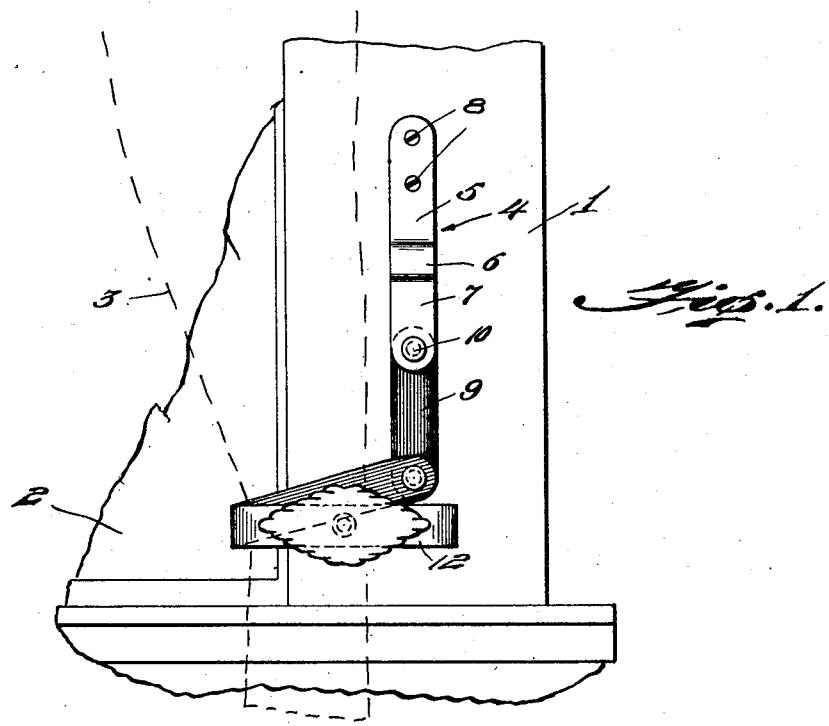
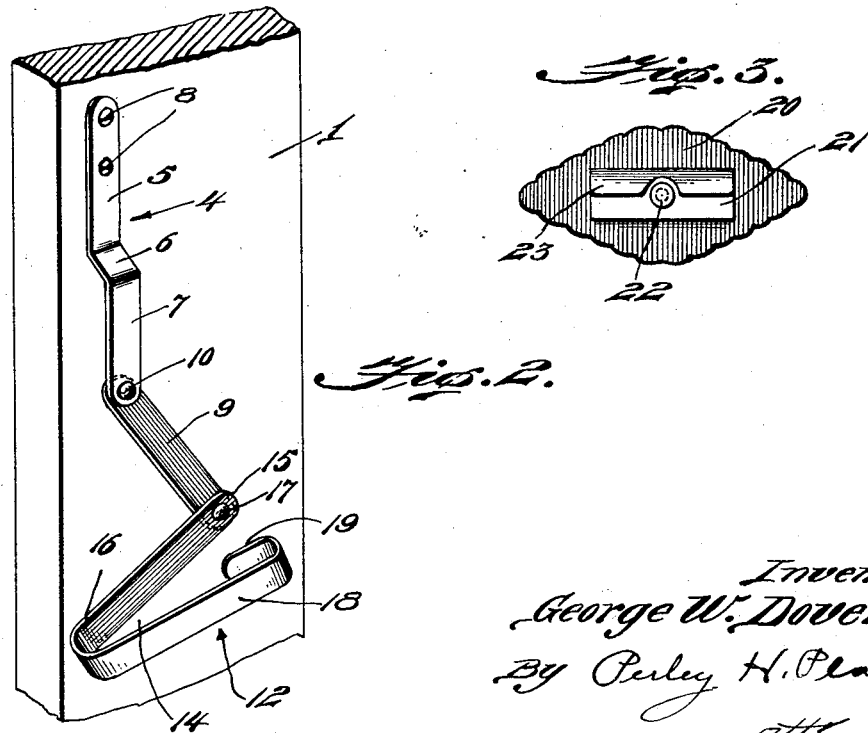

1,836,017

UNITED STATES PATENT OFFICE

GEORGE W. DOVER, OF PROVIDENCE, RHODE ISLAND, ASSIGNOR TO DOVER CRAFT COMPANY, INC., OF PROVIDENCE, RHODE ISLAND, A CORPORATION OF RHODE ISLAND

HOLDBACK MEANS FOR CURTAINS

Application filed January 13, 1931. Serial No. 508,414.

This invention relates to an improved hold-back means for curtains, for use in connection with window curtains to hold portions of curtains or draperies away from the central portion of a window.

One object of the invention is to provide a novel device of this character comprising a supporting member and means associated therewith including a hold-back member, whereby the supporting member may be secured to a portion of a window frame in such a manner that a part thereof is in off-set relation to the frame and whereby the hold-back member is in off-set relation to the frame and to that portion of the supporting member which is secured to the frame.

Another object of the invention is the provision of a device of this character wherein the hold-back member may be removably secured in a plurality of adjusted positions relative to the window frame.

A further object of the invention is the provision of suitable frictional means for temporarily holding the several parts of the structure in any one of various adjusted positions while permitting the same to be moved from one position to another as may be desired.

Another object of the invention is the provision of an improved hold-back member of curved or angular form shaped to receive curtains or draperies and provided with a portion adapted to retain the curtains or draperies against accidental movement therefrom, and at the same time provide means for connecting the hold-back member with a supporting member.

Other objects and advantages of the invention relate to various improved details of construction and novel arrangements of the parts as will be more fully set forth in the detailed description to follow.

Referring to the drawings:—

Fig. 1 is a front elevational view of a portion of a window frame showing my improved hold-back means in position upon the frame and the location of the curtains or draperies as they are held back from the window by the hold-back member, Fig. 2 is a detailed perspective view of the hold-back means showing the same in position upon a portion of a window frame and illustrating one arrangement of the parts when the connecting member and hold-back member are adjusted at an angle to each other and to the supporting member, and Fig. 3 is a rear elevational view of the ornamental plate.

In the embodiment of the invention illustrated herewith 1 designates a portion of a window frame adjoining a window 2, and 3 designates a portion of a curtain or drapery showing the same in draped position relative to the window and held in position by the hold-back means.

The improved hold-back means comprises a supporting member 4 provided with a portion 5 for attachment to the frame of a window and having a bend 6 formed therein intermediate its ends and a portion 7 off-set from the frame 1 of the window. The supporting member may be secured to the window frame in any suitable or desired manner such as screws 8 passed through the portion 5 thereof, and a connecting member 9 is secured to the off-set portion 7 of the supporting member, as by a rivet or other suitable fastening means 10, preferably in such a manner as to permit the connecting member 9 to pivot relative to the supporting member.

A hold-back member 12, the main body portion of which is bent to form an interior recess 14 for the reception of the curtains or draperies, has one end 15 thereof bent upwardly as shown at 16 at an angle to the main portion of the hold-back member, and this angular end portion 15 is secured to the end of the connecting member 9 by rivet or other suitable fastening ends 17, preferably in such a manner as to permit the hold-back member to be angularly adjusted relative to the connecting member 9 and be held in any one of a plurality of adjusted positions relative thereto by means of the frictional contact between the hold-back member 12 and the connecting member 9. A portion 18 of the hold-back member may be substantially straight in order to more readily receive an ornamental plate, and the end 19 of the hold-back member may be inturned to provide a more or less limited space between the inturned end 19 and the angular end 15 of the hold-back member for the insertion and removal of the curtains or draperies. The inturned end 19 of the hold-back member serves to restrict somewhat the passageway to the recess 14 whereby the curtains or draperies may not be accidentally removed from the recess 18 when placed therein.

An ornamental plate 20 which may be of any desired shape and provided with any suitable ornamentation, in conformity with the ornaments carried by the curtain rods, has the rear surface thereof substantially plane and a channel shaped attaching member 21 is secured to the rear face of the ornamental plate by a screw or other fastening means 22. The channel shaped attaching member 21 is so constructed that a portion 23 thereof will engage over the straight portion 18 of the hold-back member whereby the ornamental plate may be secured in position thereon, substantially shown in Fig. 1 of the drawings, so as to partially or wholly conceal the hold-back member from view.

It will be seen that by the provision of an off-set portion 7 in the supporting member the connecting member 9 and hold-back member 12 are both mounted in off-set relation to a window frame 1 whereby the hold-back member may be readily moved into any one of a plurality of adjusted positions relative to the supporting member without engaging with any portion of the frame 1 and without injuring or abrading the curtains or draperies by bringing them into contact with the frame.

While I have shown the connecting member 9 as pivotally connected both to the supporting member 4 and to the hold-back member 12, the parts may be constructed and secured together in such a manner that the hold-back member will pivot about either the points 10 or 17, or both of them, whereby the hold-back member may be positioned in any one of a plurality of lateral or angular positions relative to the frame 1. It is to be understood also that the supporting member, connecting member and hold-back member may be secured together in such a manner at the points 10 and 17 that they will be frictionally held in any one of the plurality of adjusted positions in which they may be placed until moved therefrom.

While the hold-back member 12 has been shown as curved to provide the interior recess 14 for the reception of the curtains or draperies, it is to be understood that it may be formed with sharp bends or otherwise shaped to provide the internal recess 14, and the end 19 thereof may be similarly shaped to extend partially across the opened end of the recess and thus restrict the same to prevent accidental movement of the curtains or draperies without departing from the spirit and intent of my invention.

What I claim is:—

1. A hold-back means for curtains comprising a supporting member having a portion for attachment to a frame and a portion arranged substantially parallel with said first named portion and off-set therefrom, a hold back member, and means connecting said hold-back member and supporting member whereby the hold-back member is located in off-set relation to the frame and may be held in any one of a plurality of adjusted positions relative thereto.

2. A hold-back means for curtains, which comprises a supporting member, having a portion for attachment to a frame and a portion arranged substantially parallel with said first named portion and off-set from said first named portion, a hold-back member, and means connecting said supporting member and hold-back member whereby the hold-back member may be moved into any one of a plurality of adjusted positions within the same plane and be held in either of such positions by the frictional engagement of the parts.

3. In a hold-back means for curtains comprising a supporting member, a hold-back member, a connecting member pivotally connecting said hold-back member and said supporting member, said hold-back member and connecting member being each movable about its point of pivotal connection with the connecting member and supporting member respectively, whereby said hold-back member and connecting member may be moved into any one of a plurality of adjusted positions relative to said supporting member.

4. In a hold-back means for curtains, a supporting member having a portion for attachment to a frame and a portion off-set from said first named portion and lying within a plane substantially parallel with the plane of said first named portion, a connecting member having one end pivotally secured to the offset portion of said supporting member and a curved hold-back member pivoted to said connecting member, said hold-back member and connecting member being each movable about its point of pivotal connection with the connecting member and supporting member respectively whereby the hold-back member may be moved into any one of a plurality of angularly adjusted or transversely off-set positions relative to and in a plane substantially parallel with said supporting member.

5. In a hold-back means for curtains, a supporting member, a connecting member carried by said supporting member, and a curved hold-back member having one end thereof off-set at an angle to the transverse plane of the remaining portion of the member and secured to said connecting member.

6. In a curtain holding device of the character described, a curved hold-back member having one end off-set at an angle to the transverse plane of the remaining portion of the member and the opposite end inturned within the hold-back member and adapted to retain a curtain against accidental withdrawal from the hold-back member.

7. In a curtain holding device of the character described a hold-back member bent to provide an inner recess bounded substantially by the outline of said hold-back member and having one end inturned to provide a narrow opening communicating with said internal recess, and means for supporting said hold-back member in any one of a plurality of angularly adjusted or transversely off-set positions relative to a curtain.

8. In a hold-back means for curtains, a supporting member, a connecting member carried by said supporting member, a hold-back member having a portion thereof secured to a portion of said connecting member, and means connecting said members whereby said hold-back member may be moved into and frictionally held in any one of a plurality of angularly adjusted or transversely off-set positions relative to and in a plane substantially parallel with said supporting member.

In testimony whereof I have affixed my signature.

GEORGE W. DOVER.